Patented Aug. 23, 1949

2,479,628

UNITED STATES PATENT OFFICE 2,479,628

ALKALI-ORGANIC SOLVENT PAINT REMOVER

Lester E. Kuentzel, Wyandotte, Mich., assignor to Wyandotte Chemicals Corporation, Wyandotte, Mich., a corporation of Michigan No Drawing. Application January 25, 1946, Serial No. 643,467

5 Claims. (Cl. 252—105)

The present invention relates to a composition for removing or stripping paint, varnish, lacquer and enamel from wood, glass, fabric and metal surfaces. As indicated by the title, the paint remover composition made according to the principles of my invention, consists essentially of inorganic alkaline compounds and organic solvent ingredients.

Heretofore, organic solvents, such as benzene hydrocarbons, aliphatic alcohols, ketones, ethers, esters and chlorinated organic compounds have found extensive use in the paint stripping art due to certain advantages possessed thereby, more especially their relatively high stripping or paint solvent powers. On the other hand, inorganic alkalies such as caustic soda and alkaline sodium salts have also been used as the basis of paint remover compositions which display the advantages of non-inflammability, non-volatility, non-toxicity, use in water solution, and relatively low cost.

The organic solvents have generally been subject to the objections of relatively high cost, rapid evaporation and inability to be used in heated solutions, and corrosive attack on metals. Conversely, the inorganic alkalies, although relatively cheap and adaptable for use in heated solutions, do not possess the high stripping or solvent power of the organic solvents.

It is the general object and nature of my present invention to provide a paint remover composition incorporating the advantages of both the alkaline and the organic solvent type of paint remover compositions, while at the same time avoiding the disadvantages heretofore encountered. A further object of my invention is to provide a paint remover composition which is non-corrosive to a substantial majority of the ferrous and non-ferrous metal surfaces to which it is most likely to be applied.

It is a further object and advantage of this invention to provide a paint remover composition which is well suited to relatively high temperature operating conditions without adversely affecting its stripping power and without significant evaporation loss of any of its components other than water, which may be easily replaced. In fact, the paint remover compositions made according to the principle of my invention have been found to increase their paint removing or stripping ability with increase in their temperature of use, up to the boiling point of water.

The simple admixture of an alkali and an organic solvent, is not capable of solving the problem with which my invention is concerned. Certain organic solvents, such as alcohols, react with caustic soda and alkaline sodium salts; others are immiscible with water so that the resultant mixture of the alkali organic solvent cannot conveniently be made up into a single phase, aqueous solution for use, such as in dip tanks.

I have made the discovery, that the mono- and poly-ethylene glycol monobutyl ethers constitute a class of organic solvents capable of successful combination and utilization when in admixture with the inorganic alkalies, and of producing a single phase liquid mixture when made up into relatively dilute aqueous solution. Ethylene glycol monobutyl ether, available on the market under the trade-name of "Butyl Cellusolve," and diethylene glycol monobutyl ether available commercially under the trade-name "Butyl Carbitol" serve as excellent organic solvents for use in the paint remover composition of my invention.

To the accomplishment of these and additional objectives and to enable any person skilled in the art readily to understand and practice the invention, the following full and concise description sets forth the best mode in which I have contemplated applying the principle thereof.

In formulating my paint remover composition, I employ the water soluble, alkali metal salts and the ethylene glycol monobutyl ethers in proportions (by weight) of substantially 5–10 parts of the organic compound to 3 parts of the inorganic alkali salts. A wetting agent, such as an alkylaryl sulfonate, an alkyl sulfonate or a sodium sulfonate of a high molecular weight alcohol, can be incorporated to good advantage in this mixture.

The resultant composition is either a 2-phase liquid-liquid concentrate mixture or a 2-phase liquid-solid concentrate depending on presence or absence of water in the formulation which lends itself quite advantageously and economically to shipping, and storage, since it can subsequently be made up into a water solution for use. The amount of water for the 2-phase liquid concentrate is that which is sufficient to dissolve the alkali metal salts. When made up in such water solution, the resultant composition then becomes a single liquid phase in which all ingredients enter into aqueous solution. The admixture with water of my paint remover composition in approximately 9% by weight or 12 oz. per gallon, of the liquid-solid type or a 1 to 3 dilution of the liquid-liquid type, will be found satisfactory for most conditions of usage.

As to the alkali metal salt ingredients of my composition, I have determined that the sodium salts of silicic, carbonic and thiosulfuric acids, e. g. sodium metasilicate ($Na_2SiO_3$), sodium carbonate ($Na_2CO_3$), sodium bicarbonate ($NaHCO_3$) and sodium thiosulfate ($Na_2S_2O_3$), are extraordinarily suitable for incorporation in the composition. Modified soda, which is a chemically produced mixture of sodium carbonate and bicarbonate, such as derivable from the ammonia soda process, also serves as a suitable source for these two particular alkali metal salt ingredients. These particular alkali metal salts display improved advantages over other inorganic alkalies in stripping power and suppression of metallic corrosion.

The preferred formulations made according to my invention, are not corrosive in their action upon such metals as copper, iron, "Monel" metal, tin and especially aluminum alloys, the latter in both their brightly polished and anodized conditions.

The paint remover compositions of my invention were subjected to the tests as specified in the U. S. Navy Aeronautical Specification, C-67, wherein stripping test panels are made up according to the following specification:

Test panels shall be 0.051 inch thick aluminum alloy sheet. Each panel shall be 3 by 6 inches with corners and edges broken and smoothed and a ⅜ inch hole drilled near one end. Three panels shall be numbered 70, 72 and 75 by stamping or engraving. Panels shall then be anodized in accordance with Specification AN-QQ-A-696 (chromic acid type film). Panels shall be finished as indicated in Table I. Allow panels to air dry two weeks or more before stripping.

*Table I*
STRIPPING TEST PANELS FINISHES

| Panel | Priming Coat | | Product (2 Coats) | |
|---|---|---|---|---|
| | Material | Drying Time (Room Temp.) Before Next Coat | Material | Drying Time (Room Temp.) Between Coats |
| | | Hours | | Hours |
| 70 | Zinc Chromate, AN-TT-P-656 | 1 | Varnish, Aluminized, AN-TT-V-118 | 6 |
| 72 | do | 1 | Lacquer, High Resin Phthalate, AN-TT-L-51 Aluminized. | 6 |
| 75 | do | 1 | Enamel Glyceryl Phthalate Gray, E-5 | 6 |

The following examples illustrate preferred formulations of paint remover compositions embodying the principle of my invention:

EXAMPLE 1
(LIQUID-SOLID FORMULATION)

| Constituents | Per cent by Weight |
|---|---|
| Sodium Metasilicate (pentahydrate) | 18.75 |
| Sodium Carbonate | 7.50 |
| Sodium Bicarbonate | 6.75 |
| Sodium Thiosulfate (pentahydrate) | 3.75 |
| $C_{13-20}$ Alkyl Sulfonate Wetting Agent | 0.75 |
| Ethylene Glycol Monobutyl Ether ("Butyl Cellosolve") | 62.50 |
| | 100.00 |

"M. P. 189" is the trade name of a sodium alkyl sulfonate derived from the reaction with chlorine and sulfur dioxide, of a liquid aliphatic hydrocarbon, such as a petroleum hydrocarbon distillate boiling in the range of 250–360° C., followed by saponification or neutralization. Cf. U. S. Pat. No. 2,197,800. Hence, it is chemically identified as a "$C_{13-20}$ alkyl sulfonate."

The stripping power or paint removing ability of the formulation of Example 1, on being made up into a 12 oz. (avoirdupois) per gallon water solution (approximately a 9% dry weight solution of the formulation constituents) and subjected to tests on panel Nos. 70, 72 and 75 of the foregoing specification of Table I, disclosed the following results:

*Table II*

| Temperature | Stripping Power (time in minutes to completely loosen coating on test panels numbers) | | |
|---|---|---|---|
| | 70 | 72 | 75 |
| 160° F | 12 | 6 | 25 |
| 212° F | 4 | 2 | 7 |

EXAMPLE 2
(LIQUID-SOLID FORMULATION)

In the following exemplary formulation, diethylene glycol monobutyl ether or "Butyl Carbitol" has been substituted for the "Butyl Cellosolve," the other ingredients remaining the same and in the same proportions, viz:

| Constituents | Percent by Weight |
|---|---|
| Sodium Metasilicate (pentahydrate) | 18.75 |
| Sodium Carbonate | 7.50 |
| Sodium Bicarbonate | 6.75 |
| Sodium Thiosulfate (pentahydrate) | 3.75 |
| Wetting Agent ("M. P. 189") | 0.75 |
| Diethylene Glycol Monobutyl Ether ("Butyl Carbitol"). | 62.50 |
| | 100.00 |

The outstanding stripping power of the above described paint remover compositions is all the more unusual and unexpected when it is considered that the inorganic alkali ingredients on the one hand and the organic solvents on the other hand, do not in and of themselves produce a paint stripping or removing action which is at all comparable to the admixture of the inorganic and organic components with each other. Thus, a formulation comprising all of the ingredients of Example 1 with the exception of "Butyl Cellosolve" and in the same proportion as set forth therein, was made up into a 6 oz. per gallon of water solution (33⅓% stronger concentration of the corresponding ingredients than in Example 1), and subjected to the corresponding stripping tests. This 6 oz. per gallon solution of the inorganic ingredients of the formulation of Example 1 required over 10 times as long to strip panel No. 70 and over twice as long to strip panel No. 72. On the other hand, a solution of 8 oz. per gallon of "Butyl Cellosolve" alone in water (7½ oz. per gallon of this ingredient was present in the tests of Example 1) required more than 2 hours merely to produce a softening of the coating on panel No. 72. Even a partial loosening of the coating failed to occur after several days' contact. Thus, it will be seen that the paint removing or stripping action of the combined inorganic and organic ingredients of my composition, as compared to the action of these ingredients per se, is of a synergistic nature.

EXAMPLE 3

(LIQUID-LIQUID FORMULATION)

A two-phase-liquid composition is made by first mixing the alkali salt and wetting agent ingredients in the following proportions:

| Constituents | Per Cent by Weight |
| --- | --- |
| Sodium Metasilicate (pentahydrate) | 50 |
| Sodium Carbonate | 20 |
| Sodium Bicarbonate | 18 |
| Sodium Thiosulfate (pentahydrate) | 10 |
| Wetting Agent ("M. P. 189") | 2 |
| | 100 |

These proportions correspond to the percentage proportions of the same ingredients in Examples 1 and 2. To this mixture there is then added 5 parts by weight of ethylene glycol monobutyl ether, and water equal in volume to that of the ethylene glycol monobutyl ether, to each 3 parts of the first prepared mixture.

The resultant liquid-liquid formulation may then be diluted in water in the proportion of 1 part of the formulation to 3 parts of water to produce a single phase aqueous solution which is particularly suitable for use at temperatures of 140° F. and higher, in dip tanks.

EXAMPLE 4

(LIQUID-LIQUID FORMULATION)

Diethylene glycol monobutyl ether (or "Ethyl Carbitol") is substituted for the ethylene glycol monobutyl ether of Example 3 and the resultant formulation may be employed in the same manner.

Additional exemplary formulations, in which the sodium thiosulfate is omitted from the alkali salt mixture, are noted as follows:

| | Sodium Metasilicate ($5H_2O$) | Sodium Carbonate | Sodium Bicarbonate | Modified Soda | Wetting Agent ("M. P. 189") |
| --- | --- | --- | --- | --- | --- |
| Example 5 | 50 | 25 | 23 | | 2 |
| Example 6 | 45 | 30 | 23 | | 2 |
| Example 7 | 40 | 33 | 25 | | 2 |
| Example 8 | 40 | | | 58 | 2 |

In each of the above formulations 4 oz. are added to one gallon of water; and then 8.16 oz. (6% by weight) of ethylene glycol monobutyl ether ("Butyl Cellosolve") are added to the resultant solution. In these examples, the organic solvent is present in the amount of 6 parts by weight to 3 parts of alkali compounds.

The stripping power of the compositions from Examples 2 to 8 is tantamount to that of the composition of Example 2.

In addition to being made up in a liquid form, my paint remover composition can also be compounded in a cream or paste form by the addition of 25 to 40% by weight of bentonite.

Equivalent modes of practicing my invention may be followed provided that they are within the scope and purview of the appended claims.

I, therefore, distinctly claim and particularly point out as my invention:

1. An alkali-organic solvent, two phase liquid-solid, concentrated paint remover composition adapted to be made up into approximately a 9% by weight, single phase water solution, consisting of the following ingredients formulated in approximately the correspondingly stated percentage by weight:

| Constituents: | Per cent by weight |
| --- | --- |
| Sodium metasilicate, pentahydrate | 18.75 |
| Sodium carbonate | 7.50 |
| Sodium bicarbonate | 6.75 |
| Sodium thiosulfate, pentahydrate | 3.75 |
| $C_{13-20}$ alkyl sulfonate wetting agent | 0.75 |
| Ethylene glycol monobutyl ether | 62.50 |
| | 100.00 |

2. An alkali-organic solvent, two phase liquid-solid, concentrated paint remover composition adapted to be made up into approximately a 9% by weight, single phase water solution, consisting of the following ingredients formulated in approximately the correspondingly stated percentages by weight:

| Constituents: | Per cent by weight |
| --- | --- |
| Sodium metasilicate, pentahydrate | 18.75 |
| Sodium carbonate | 7.50 |
| Sodium bicarbonate | 6.75 |
| Sodium thiosulfate, pentahydrate | 3.75 |
| $C_{13-20}$ alkyl sulfonate wetting agent | 0.75 |
| Diethylene glycol monobutyl ether | 62.50 |
| | 100.00 |

3. An alkali-organic solvent, two phase liquid-liquid, concentrated paint remover composition transformable into a single phase water solution upon dilution with 3 parts of water to each part by weight of said concentrated composition, consisting of the ingredients in the proportions as set forth in claim 1 and water in an amount equal to the volume of the ethylene glycol monobutyl ether present.

4. An alkali-organic solvent, two phase liquid-liquid, concentrated paint remover composition transformable into a single phase water solution upon dilution with 3 parts of water to each part by weight of said concentrated composition, consisting of the ingredients in the proportions as set forth in claim 2 and water in an amount equal to the volume of the diethylene glycol monobutyl ether present.

5. A two phase concentrated paint remover composition adapted to be made up into a single phase water solution, on further dilution, consisting of an alkaline salt mixture of 40–50% by weight sodium metasilicate pentahydrate, 25–33% sodium carbonate, and 23–25% sodium bicarbonate, water present in the amount of approximately 1 gallon to 4 ounces of said mixture, and 6 parts by weight of an ethylene glycol monobutyl ether for each 3 parts of said alkaline salt mixture.

LESTER E. KUENTZEL.

REFERENCES CITED

The following references are of record in the file of this patent:

UNITED STATES PATENTS

| Number | Name | Date |
| --- | --- | --- |
| 705,139 | Priestman | July 22, 1902 |
| 1,000,162 | Ellis | Aug. 8, 1911 |
| 1,657,147 | Brainard | Jan. 24, 1928 |
| 1,812,321 | Davidson | June 30, 1931 |

FOREIGN PATENTS

| Number | Country | Date |
| --- | --- | --- |
| 337,944 | Great Britain | Nov. 13, 1940 |